(12) United States Patent
Kaymer et al.

(10) Patent No.: US 8,108,062 B2
(45) Date of Patent: Jan. 31, 2012

(54) EMBROIDERY DATA GENERATION

(75) Inventors: Andrew Kaymer, Essex (GB); Andrew Wyatt, Walthamstow (GB); Martin Tatar, Essex (GB)

(73) Assignee: VSM Group AB, Husqvarna (SE)

( * ) Notice: Subject to any disclaimer, the term of this patent is extended or adjusted under 35 U.S.C. 154(b) by 1416 days.

(21) Appl. No.: 11/551,461

(22) Filed: Oct. 20, 2006

(65) Prior Publication Data

US 2007/0101918 A1    May 10, 2007

(30) Foreign Application Priority Data

Oct. 20, 2005   (GB) .................................. 0521397.0

(51) Int. Cl.
*D05C 5/02* (2006.01)
(52) U.S. Cl. .................................. 700/138; 112/470.01
(58) Field of Classification Search .......... 700/136–138; 112/470.01, 470.04, 475.18, 475.19
See application file for complete search history.

(56) References Cited

U.S. PATENT DOCUMENTS

| | | | | |
|---|---|---|---|---|
| 4,446,520 | A | 5/1984 | Shigeta et al. ................. | 364/400 |
| 4,706,584 | A * | 11/1987 | Senda et al. .............. | 112/470.03 |
| 4,969,410 | A | 11/1990 | Brower et al. | |
| 6,167,824 | B1 * | 1/2001 | Tomita ..................... | 112/475.19 |
| 6,450,110 | B1 * | 9/2002 | Bruhl et al. .............. | 112/470.01 |
| 6,470,813 | B2 * | 10/2002 | Ebata et al. ................ | 112/102.5 |
| 6,871,606 | B2 * | 3/2005 | Schweizer ............... | 112/475.02 |
| 6,883,446 | B2 * | 4/2005 | Koerner .................... | 112/475.02 |
| 6,959,657 | B1 * | 11/2005 | Duval ....................... | 112/475.02 |
| 7,278,362 | B2 * | 10/2007 | Hirata et al. ................. | 700/138 |
| 2007/0005175 | A1 * | 1/2007 | Konig et al. ................. | 700/138 |

FOREIGN PATENT DOCUMENTS

| | | |
|---|---|---|
| DE | 10321265 A1 | 5/2003 |
| GB | 2 207 778 A | 2/1989 |

OTHER PUBLICATIONS

The United Kingdom Search Report from Application No. 0521397.0 filed Oct. 20, 2005.
The United Kingdom Examination Report from Application No. GB0521397.0. Report issued Jul. 5, 2010.
Response to Examination Report for corresponding UK application 0521397.0 dated Nov. 16, 2010.
Wright, Susan, Guide C-213, College of Agriculture, Consumer and Environmental Sciences New Mexico State University, May 2001, 6 pages, New Mexico State University.
The United Kingdom Examination Report from application No. GB0521397.0, dated Mar. 14, 2011.
Response to the United Kingdom Examination Report from application No. GB0521397.0, filed Apr. 4, 2011.
The United Kingdom Examination Report from application No. GB0521397.0, dated Jun. 29, 2011.
Response to the United Kingdom Examination Report from application No. GB0521397.0 dated Jun. 29, 2011.

* cited by examiner

*Primary Examiner* — Nathan Durham
(74) *Attorney, Agent, or Firm* — Theodore M. Magee; Westman, Champlin & Kelly, P.A.

(57) ABSTRACT

A method of generating embroidery data for controlling stitching out by an embroidery machine. The method comprises simulating a position of a needle on an embroidery workspace and updating the needle position in response to an input control signal. A series of stitch time points is generated and embroidery data defining a stitch is generated. The data defining a stitch being dependent upon the needle position at a corresponding stitch time point and at a preceding stitch time point.

41 Claims, 9 Drawing Sheets

EMBROIDERY DATA GENERATION

BACKGROUND

This invention relates to generating embroidery data for controlling stitching out by an embroidery machine.

It is known for an embroidery designer to create an embroidery design on a computer using a design tool. The embroidery design may then be supplied as embroidery data to an embroidery machine (such as a sewing machine) which can then be configured to perform embroidery according to the received embroidery data. Typically, this involves an operator securing a piece of fabric within a hoop (or frame) that the embroidery machine can move relative to its needle, the movement being in accordance with the embroidery data so that the desired embroidery is automatically produced on the fabric. This is known as "stitching out" by the embroidery machine.

Computer implemented tools for designing embroideries typically provide a user interface depicting a fabric (or embroidery workspace) onto which stitches are placed. Stitch placement is performed by indicating a start-point and an end-point of a stitch, although a stitch start-point may be assumed to be the end-point of the immediately preceding stitch. In a mouse operated computer system, indication of stitch start- and end-points can be achieved by clicking one of the mouse buttons. Other input devices can be used in a similar manner.

Despite the capabilities of such embroidery design tools, there are a number of embroidery techniques that can be performed by a human operator of an embroidery machine but that cannot be easily replicated with such design tools. This makes the use of these design tools slow and cumbersome (and sometimes impossible) when designing embroideries based on these embroidery techniques.

One such embroidery technique is the so-called "free motion embroidery" (a description of which is contained in "Free-Motion Machine Embroidery", Susan Wright, Guide C-213, College of Agriculture and Home Economics, New Mexico State University). In free motion embroidery, the operator of the embroidery machine places the fabric within the hoop and then moves the hoop relative to the needle of the embroidery machine. The operator moves the hoop by hand. For a given needle speed (stitch rate), the faster the operator moves the hoop, the longer a stitch will be.

Current embroidery design tools are not capable of allowing a designer to quickly and easily design an embroidery that has the characteristics of free motion embroidery.

SUMMARY

According to an aspect of the present invention, there is provided a method of generating embroidery data for controlling stitching out by an embroidery machine, the method comprising the steps of:

simulating a position of a needle on an embroidery workspace;

updating the needle position in response to an input control signal;

generating a series of stitch time points; and generating embroidery data defining a stitch, the data defining a stitch being dependent upon the needle position at a corresponding stitch time point and at a preceding stitch time point.

When performing embroidery design using this method, a series of stitch time points are generated automatically. These represent a point in time at which an embroidery machine would perform a stitching operation with its needle. The position of the needle relative to the fabric, or embroidery workspace, is controlled by the user so that stitches are generated, at the stitch time points, based on the position of the needle at the current stitch time point (i.e. the stitch's end-point) and the position of the needle at a preceding stitch time point (i.e. the stitch's start-point). The user does not need to indicate (e.g. via a mouse-click) where each stitch should be placed; instead, stitches are generated automatically at each stitch time point in a manner closely resembling free motion stitching. As with free motion stitching performed on an embroidery machine, the faster the designer moves the simulated needle relative to the embroidery workspace, the larger the next stitch will be, i.e. the length of a stitch depends upon the relative speed of the embroidery workspace and the needle position.

Preferably, the time period between stitch time points is user-controllable.

According to another aspect of the invention, there is provided a method of implementing free-motion style embroidery on an embroidery machine, the method comprising the steps of:

providing a computer implemented tool enabling a user to generate free-motion style embroidery data through relative movement of a needle position and an embroidery workspace; and providing the generated embroidery data for stitching out on the embroidery machine.

When performing embroidery design using this method, the computer implemented tool allows the user to move a needle position and an embroidery design relative to each other (as in conventional free-motion style embroidery), the embroidery data being generated in accordance with this relative movement. Therefore, the faster the relative movement, the longer the stitches will be when the embroidery machine stitches out the embroidery design.

To help perform the above-mentioned methods, the present invention also provides a computer implemented tool for use in generating embroidery data for controlling stitching out by an embroidery machine, the tool comprising:

a graphical user interface depicting an embroidery workspace and a needle position;

a position control operable to enable a user to control the relative position of the embroidery workspace and the needle; and a stitch generator operable to generate embroidery data defining a series of stitches in dependence upon the relative position of the embroidery workspace and the needle at a series of time points.

Additionally, the present invention also provides a computer implemented tool for generating data defining an embroidery design comprising a series of stitches, wherein the spacing of successive stitches depends upon the speed of a user controlled relative movement between a simulated embroidery workspace and a stitching point.

In preferred embodiments, data defining a stitch need not be generated at each of the time points. Rather, the generation of data defining a stitch may be dependent upon one or more other factors. For example, in preferred embodiments, data defining a stitch is generated only if the position of the needle has moved sufficiently far relative to the workspace. This has an advantage in that generation of new stitch data is prevented whilst the user is not moving the needle (or is only moving it by a small amount) during a period in which the designer is considering how to proceed with the design.

Various other respective aspects and features of the invention are defined in the appended claims.

BRIEF DESCRIPTION OF THE DRAWINGS

Embodiments of the invention will now be described, by way of example only, with reference to the accompanying drawings, in which.

DETAILED DESCRIPTION

Figure 1:
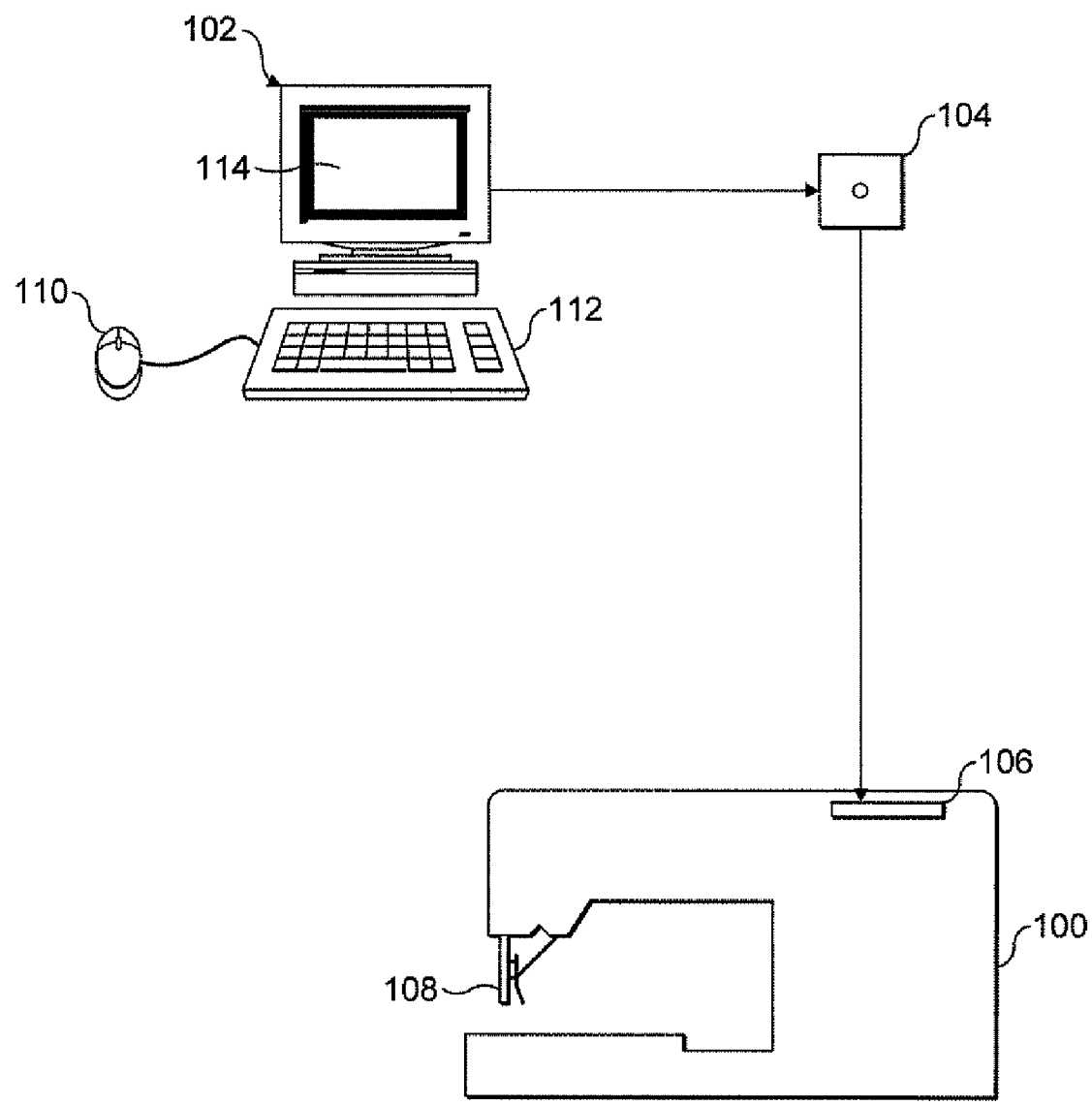
FIG. 1 schematically illustrates an embroidery machine capable of receiving embroidery data generated by a computer implemented embroidery design tool.

FIG. 1 schematically illustrates an embroidery machine 100 capable of receiving embroidery data generated by a computer implemented embroidery design tool. A computer 102 is used by a designer to prepare a free motion embroidery design, as will be described in more detail below. When the design has been completed, the computer 102 saves generated embroidery data onto a disk 104 which may be inserted into a disk drive 106 of the embroidery machine 100. An operator of the embroidery machine 100 can then configure the embroidery machine 100 to perform embroidery according to the embroidery data on the disk 104 (as read by the disk drive 106). Typically, this involves the operator securing a piece of fabric within a hoop (or frame) (not shown in FIG. 1) that the embroidery machine 100 can move automatically relative to its needle 108. The embroidery machine 100 then stitches out the embroidery according to the embroidery data read from the disk 104, i.e. it controls the movement of the fabric and the operation of its needle 108 according to the embroidery data so that the desired embroidery is automatically produced on the fabric.

It will be appreciated that mechanisms for supplying embroidery data to the embroidery machine 100, other than the disk 104, are possible. These could include, for example, a cable connecting the computer 102 to the embroidery machine 100, or alternatively a wire-less link established between the computer 102 and the embroidery machine 100.

A designer may operate the computer 102 via a mouse 110 and a keyboard 112 connected to the computer 102, the mouse 110 and the keyboard 112 generating control signals that are interpreted by the computer 102 and the design tool. However, it will be appreciated that other input devices may be used, such as one or more of: a light pen, a drawing tablet, a joystick, a touch screen and a touch pad, alone or in combination. The designer views the current state of his embroidery design using a graphical user interface 200 (schematically illustrated in FIG. 2) of the design tool, which is displayed on a display unit 114.

Figure 2:
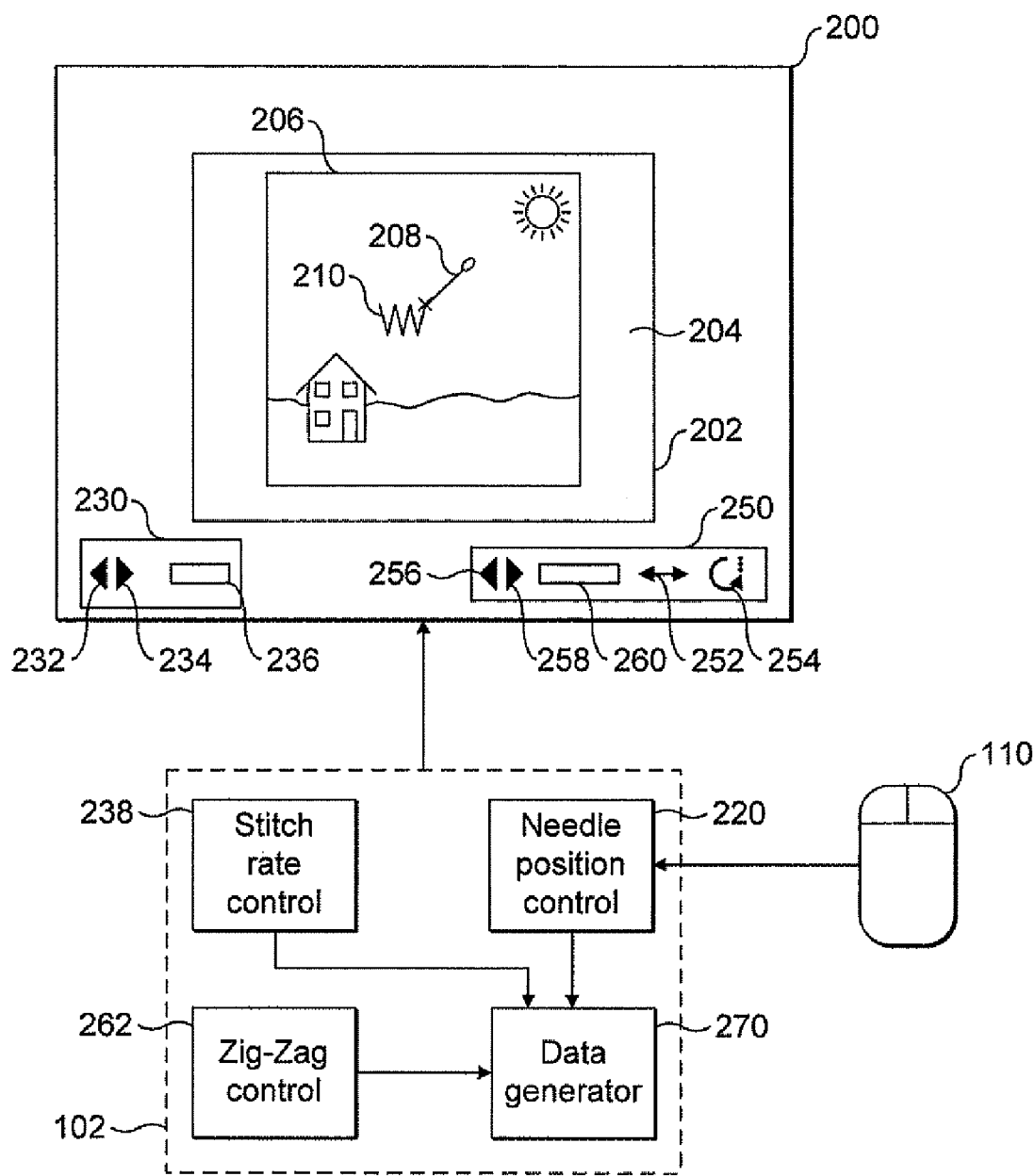
FIG. 2 schematically illustrates a user interface and other aspects/features of a design tool.

FIG. 2 schematically illustrates the user interface 200 and other aspects/features of the design tool presented to a designer by the computer 102 on the display unit 114. It will be appreciated that FIG. 2 illustrates only part of the user interface and that various features of the design tool (such as conventional option menus etc.) are not shown.

A box 202 represents the hoop, the dimensions of which may be input by the designer to match the size of the hoop that is to be used by the embroidery machine 100 when performing stitching out of the embroidery design. The hoop defines an embroidery workspace 204 within which stitches may be placed by the designer. A reference picture 206 is displayed within the embroidery workspace 204 (preferably centred within the workspace 204) to assist the designer in the placement of stitches, although it will be appreciated that the designer does not have to use a reference picture 206 and that more than one reference picture 206 could be used. The reference picture 206 may be stored locally by the computer 102 (for example on a hard disk drive of the computer 102), may be stored on a network (not shown) to which the computer 102 is connected, or may be obtained directly by scanning a picture using a scanner (not shown). The design tool may allow the designer to perform image processing operations (such as re-sizing, rotation, cropping, colour adjustment, etc.) on the reference picture 206 to produce a desired effect. The reference picture 206 may be displayed in a faded (or semi-transparent) form (using alpha-blending as is known in the art). A grid (not shown) may also be displayed to assist the designer.

The design tool simulates the position of the needle 108 of the embroidery machine 100 on the workspace 204, and indicates this with a needle icon/pointer 208. The designer then moves the icon 208 within the workspace 204 to indicate where stitches are to be placed. This will be described in more detail below. As stitches are placed within the workspace 204, the user interface 200 shows their placement 210. The user interface 200 is updated in real-time as new stitches are added to the design. The position of the last stitch is indicated to the designer, for example, with a cross. The user interface 200 also indicates where a prospective next stitch would be placed, for example by showing a straight line extending from the end-point of the last stitch to where the icon 208 is current positioned. This is updated in real-time as the user controls the position of the icon 208, The designer may save his design, for example to the disk 104. The embroidery data is preferably saved independently from the data defining the reference picture 206.

The designer may also load a design, for example from the disk 104. When a design is loaded into the design tool, the user interface 200 depicts the placement 210 of the stitches that the designer has prepared so far. This may be used when the designer returns to an incomplete design. As with saving embroidery data, the embroidery data is preferably loaded independently from the data defining the reference picture 206.

The designer controls the position of the icon 208 by moving the mouse 110. The movement of the mouse 110 is detected and interpreted by a needle position control 220 which forms part of the design tool being executed by the computer 102. In one embodiment, the user must keep one of the buttons of the mouse 110 depressed whilst performing the stitch placement; in another embodiment, the user commences the stitch placement by pressing and releasing one of buttons of the mouse 110 (there being no subsequent need to maintain a button of the mouse 110 depressed). The needle position control 220 then updates the position of the icon 208 in response to the detected movement of the mouse 110. Stitches may not be placed outside of the embroidery workspace 202, as this would represent stitching outside of the hoop, which is to be avoided.

The user interface 200 also provides the user with a stitch rate input control 230 to adjust the stitch rate (i.e. the period of time between successive stitches), as will be discussed in more detail with reference to FIG. 3. The user may interact with the control 230 by: (i) activating a button 232 to decrease the stitch rate; (ii) activating a button 234 to increase the stitch rate; and/or (iii) entering a desired stitch rate within a stitch rate entry box 236 using the keyboard 112. The design tool comprises a stitch rate control 238 that responds to the interaction of the user with the stitch rate input control 230. The stitch rate control 238 automatically generates stitch time points (as described below with reference to FIG. 3) in accordance with the selected stitch rate.

It will be appreciated that other methods for adjusting the stitch rate are possible. For example, instead of using the mouse 110, the user may use a pressure sensitive tablet (not shown) for interacting with the design tool. In this case, the stitch rate control 238 detects the pressure applied by the user on the tablet and adjusts the stitch rate accordingly (for example, the stitch rate set by the stitch rate control 238 may be proportional to the detected pressure). Similarly, certain keys on the keyboard 112 may be allocated to allow the user to increase and/or decrease the stitch rate. Alternatively, the mouse 110 may be provided with a "roller" which may be used to increase and/or decrease the stitch rate. These three methods have the advantage that the user does not have to "leave" the embroidery workspace 202 to move to the stitch rate input control 230 whilst preparing the embroidery design in order to adjust the stitch rate. The stitch rate input control 230 is therefore preferably used for setting an initial stitch rate.

It will be appreciated that the user may control the design tool to disable the ability to adjust the stitch rate during actual free motion design so as to prevent inadvertent alterations of the stitch rate.

The user interface 200 also provides the user with a zig-zag selection control 250 to select and de-select various zig-zag embroidery mode options (which will be described in more detail later with reference to FIGS. 6-9). The zig-zag selection control 250 has a horizontal zig-zag mode selection button 252 to select and de-select a horizontal zig-zag stitching mode for the embroidery design. The zig-zag selection control 250 also has a rotational zig-zag mode selection button 254 to select and de-select a rotational zig-zag stitching mode for the embroidery design. The user may further interact with the zig-zag selection control 250 by: (i) activating a button 256 to decrease the zig-zag offset; (ii) activating a button 258 to increase the zig-zag offset; and/or (iii) entering a desired zig-zag offset within a zig-zag offset entry box 260. The design tool comprises a zig-zag control 262 that responds to the interaction of the user with the zig-zag selection control 250. The zig-zag control 262 controls the generation of the embroidery data when performing zig-zag stitching operations (as will be described later).

It will be appreciated that other methods for selecting/de-selecting a zig-zag embroidery mode and adjusting the zig-zag offset are possible. For example: (i) the user may use one of the buttons of the mouse 110 to cycle between not using a zig-zag mode, using the horizontal zig-zag mode, and using the rotational zig-zag mode; and (ii) the user may use keys on the keyboard 112 to increase and/or decrease the zig-zag offset.

It will be appreciated that the user interface 200 provides other controls (not shown) for the designer to use, for example: thread colour selection; hoop size setting; stitch editing, on an individual or group basis, (such as removing a stitch, re-positioning a stitch, copying a stitch); and zooming in and out of a design. The user interacts with these controls in a similar manner to the interaction with the stitch rate input control 230 and the zig-zag selection control 250.

Some or all of the above-mentioned controls may be accessed via pull-down menus of the user interface 200 (not shown in FIG. 2).

In the embodiment shown in FIG. 2, the icon 208 is moved by the designer relative to the workspace 204 whilst the workspace remains in a fixed predetermined display position on the display unit 114. However, in an alternative embodiment, the icon 208 remains fixed at a predetermined display position on the display unit 114 and the designer creates the design by moving the workspace 204 relative to this predetermined needle display position. In this way, free motion embroidery is better simulated since, in free motion embroidery, it is the hoop and fabric that are moved relative to a stationary location of the needle 108 of the embroidery machine 100.

The design tool allows the user to print the reference picture 206 (to scale, having possibly been resized, cropped, rotated etc. by the user). The printed picture is provided with alignment marks so that the user may transfer the picture onto a fabric and be able to correctly position the fabric relative to the needle 108 of the embroidery machine 100 prior to the automatic stitching out. These alignment marks can be either automatically generated or placed manually by the designer.

The design tool comprises a stitch data generator 270 that receives signals from the needle position control 220, the stitch rate control 238 and the zig-zag control 262. The stitch data generator 270 uses these signals to generate the embroidery data representing the design being prepared by the designer, as will be described in more detail below.

Figure 3:
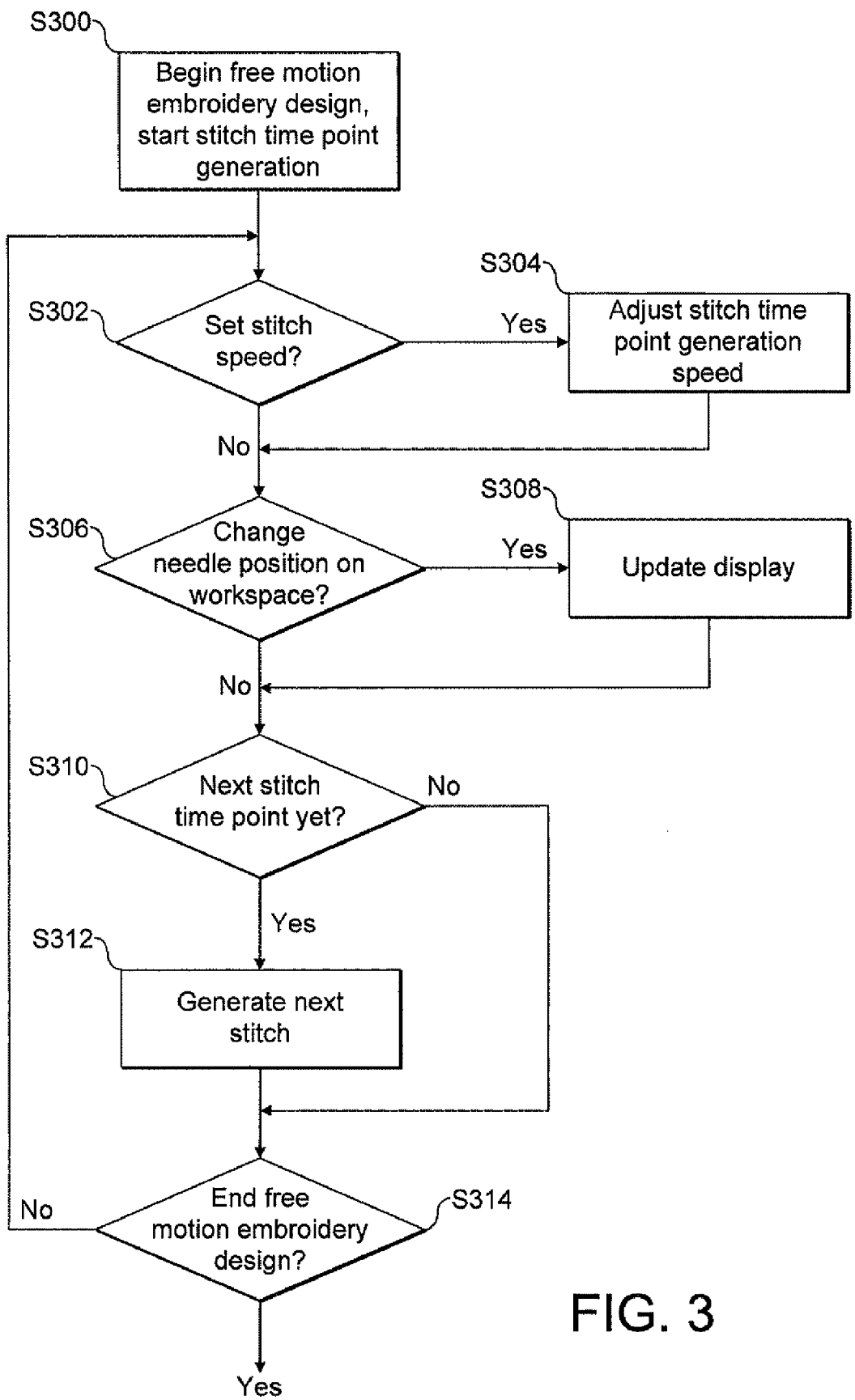
FIG. 3 is a schematic flowchart of the generation of stitches by the design tool in free motion embroidery design.

FIG. 3 is a schematic flowchart of the generation of stitches by the design tool in free motion embroidery design.

At a step S300, the designer controls the design tool to begin the free motion embroidery design. At this stage, the designer will have: defined the size of the hoop 202 and embroidery workspace 204 being used; loaded, edited and arranged any reference picture 206 within the workspace 204; and completed any other configuration requirements necessary for the design tool (such as setting a user-selectable stitch time and thread colour). On beginning the free motion embroidery design, any unrelated functions of the design tool are disabled so as not to distract the designer.

The design tool registers the current simulated needle position (position of the icon 208 relative to the workspace 204). This will be used as the start-point of the next stitch. For a new design, this position may automatically default to the centre of the workspace 204; for an existing complete or partial design, the designer may have selected an existing stitch from which to resume further stitching.

Finally, the stitch rate control 238 of the design tool initiates automatic generation of stitch time points. The stitch rate control 238 generates a series of stitch time points which simulate the times at which the embroidery machine 100 performs a stitch. In one embodiment, the stitch time points are generated with a predetermined time period between successive stitch time points. In another embodiment, the period between successive stitch time points may be pre-selected by the designer using the stitch rate input control 230, prior to commencing the design process. Typically, a value for the stitch speed is between 100 and 600 stitches per minute, so that the period between stitch time points is between 0.6 and 0.1 seconds, although it will be appreciated that these are merely illustrative examples and other ranges could be used as appropriate.

At a step S302, the stitch rate control 238 determines whether, during the design period, the stitch time is to be adjusted to a new user-selected time period via the user interacting with the stitch rate input control 230 (or via other means as described above).

If, at the step S302, it is determined that the stitch time is not to be adjusted, processing continues at a step S306. Otherwise, processing continues at a step S304 at which the stitch rate control 238 adjusts the generation of the stitch time points accordingly. If the stitch speed is to be increased, the period between stitch time points is decreased by a corresponding amount; if the stitch speed is to be decreased, the period between stitch time points is increased by a corresponding amount. Processing then continues at the step S306.

At the step S306, the needle position control 220 determines whether the designer has altered the simulated needle position (position of the icon 208) relative to the workspace 204. If it is determined that the simulated needle position has not been adjusted, processing continues at a step S310. Otherwise, processing continues at a step S308 at which the position control 220 updates the simulated needle position and updates the user interface 200. Processing then continues at the step S310.

At the step S310, it is determined whether the next stitch time point has occurred yet. If it is determined that the next stitch time point has not occurred yet, then processing continues at the step S314. Otherwise, processing continues at the step S312 at which the next stitch is generated. The current simulated needle position (position of icon 208) relative to the workspace 204 is used to define the end-point of the stitch, the start-point of the stitch being defined by the simulated needle position at the preceding stitch time point. This data defining the stitch forms part of the embroidery data generated by the stitch data generator 270. The embroidery data may also contain other data, such as thread colours. The next stitch is then displayed on the display unit 114 as a stitch 210 before processing continues at the step S314.

At the step S314, it is determined whether the free motion embroidery design has stopped. In one embodiment in which the mouse 110 is used, the designer maintains one of the mouse buttons in a depressed position whilst performing the free motion embroidery design, the design process being stopped (or interrupted) when that mouse button is released. It will be appreciated that other methods of indicating that the free motion embroidery design has stopped are possible, such as clicking on an icon/button displayed on the user interface 200 of the design tool or pressing a button on an input device (such as the right button on the mouse 110). If designing has not stopped, processing continues at the step S302. If designing has stopped, a final stitch is added, ending at the position of the simulated needle when the designing stopped.

It will be appreciated that, having stopped the free-motion embroidery design, the designer may resume the design using the above-described free motion embroidery method or using another embroidery technique (such as placing stitches individually).

Figure 4:
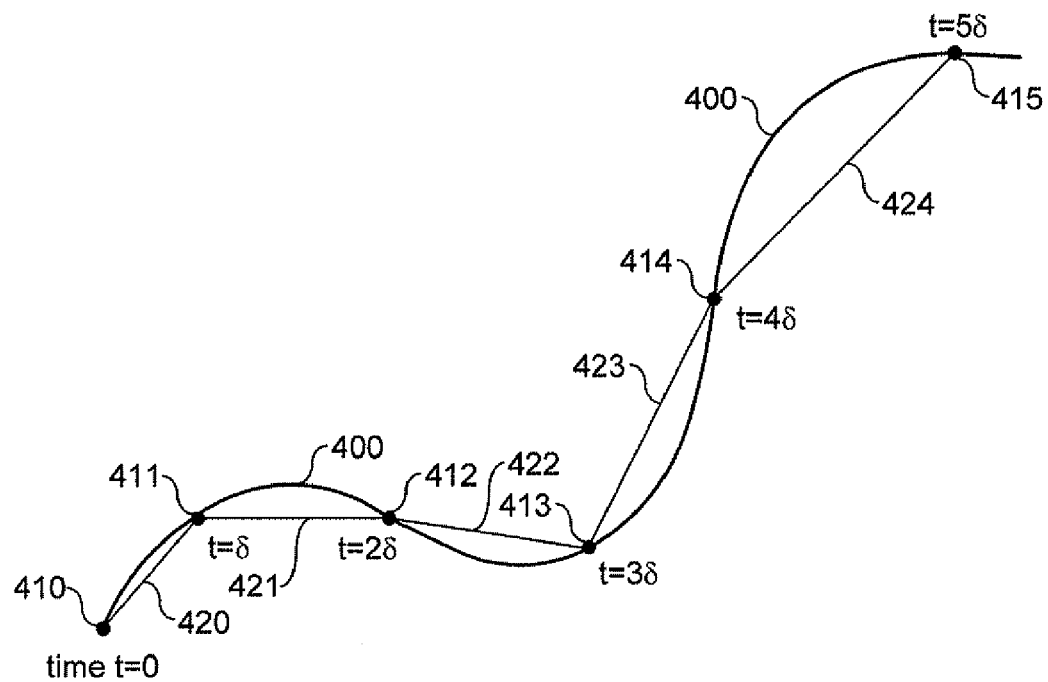
FIG. 4 schematically illustrates the positions of generated stitches as determined by a path of the simulated needle position.

FIG. 4 schematically illustrates the positions of generated stitches as determined by a path 400 of the simulated needle position. The path 400 represents the movement of the simulated needle position within the workspace 204. The designer has controlled the simulated needle position (position of icon 208 relative to the workspace 204) to trace the path 400 across the workspace 204. The period of time between stitch time points is shown as δ, so that stitch start- and/or end-points 410, 411, 412, 413, 414, 415 occur at respective stitch time points at time t=0, δ, 2δ, 3δ, 4δ, 5δ, with straight line stitches 420, 421, 422, 423, 424 being generated accordingly.

It will be appreciated that, although the time period between the stitch time points in FIG. 4 is a constant value of δ, the designer has moved the simulated needle position more slowly between time t=0 and time t=δ than between, say, time t=4δ and time t=5δ, so that the stitch 420 is shorter than the stitch 424.

Figure 5:
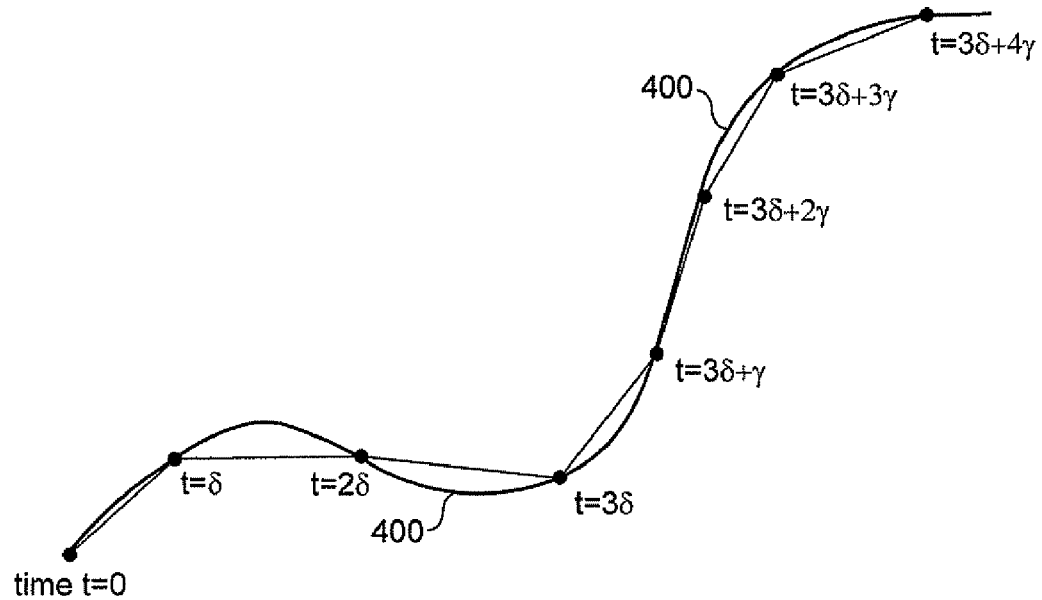
FIG. 5 schematically illustrates the positions of generated stitches on the same path as in FIG. 4, but with an intermediate reduction in time between switch time points.

FIG. 5 schematically illustrates the positions of generated stitches on the same path 400 as in FIG. 4. However, whilst the period of time between stitch time points begins as δ, it is later reduced to be γ so that stitch time points then occur at times t=0, δ, 2δ, 3δ, 3δ+γ, 3δ+2γ, 3δ+3γ, 3δ+4γ. In this example, γ is approximately half the value of δ. More stitches are therefore generated in FIG. 5 than in FIG. 4.

Figure 6:
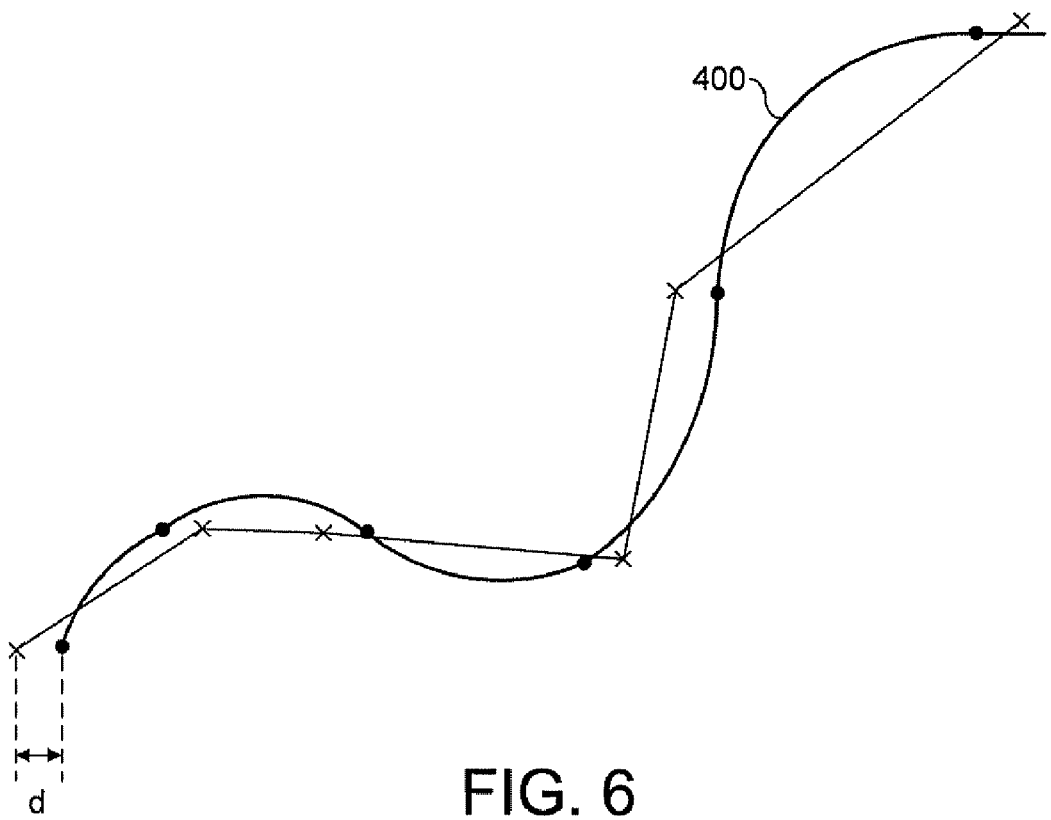
FIG. 6 schematically illustrates the positions of generated stitches on the same path as in FIG. 4 but in a "horizontal zig-zag" mode of operation.

Whilst embroidery machines 100 are most frequently used in a mode in which the needle 108 moves only in an up-down vertical direction, most embroidery machines 100 can be configured to move the needle 108 in a side-to-side lateral movement at the same time. This allows stitches in a so-called "zig-zag" formation to be created on a fabric that is moved in a straight line relative to such an embroidery machine 100. FIG. 6 schematically illustrates the positions of generated stitches on the same path 400 as in FIG. 4 but in a "horizontal zig-zag" mode of operation. The dots on the path 400 represent the same simulated needle positions at stitch time points as shown in FIG. 4 which, if joined together by straight lines, would provide the same stitches as shown in FIG. 4 and would generate the same embroidery data as that resulting from FIG. 4. However, in the horizontal zig-zag mode of operation, the actual point used as a start- and/or end-point for a stitch (and therefore used for the generation of the embroidery data) is the simulated needle position offset by an offset displacement. The displacements alternate between being a distance d to the left of the simulated needle position and a distance d to the right of the simulated needle position. However, it will be appreciated that each stitch time point may have its own corresponding offset direction, which need not be restricted to left and right of the simulated needle position. The application of the offsets/displacements to the simulated needle position when generating the embroidery data is controlled by an offset control forming part of the zig-zag control 262 (not shown in FIG. 2).

Figure 7:
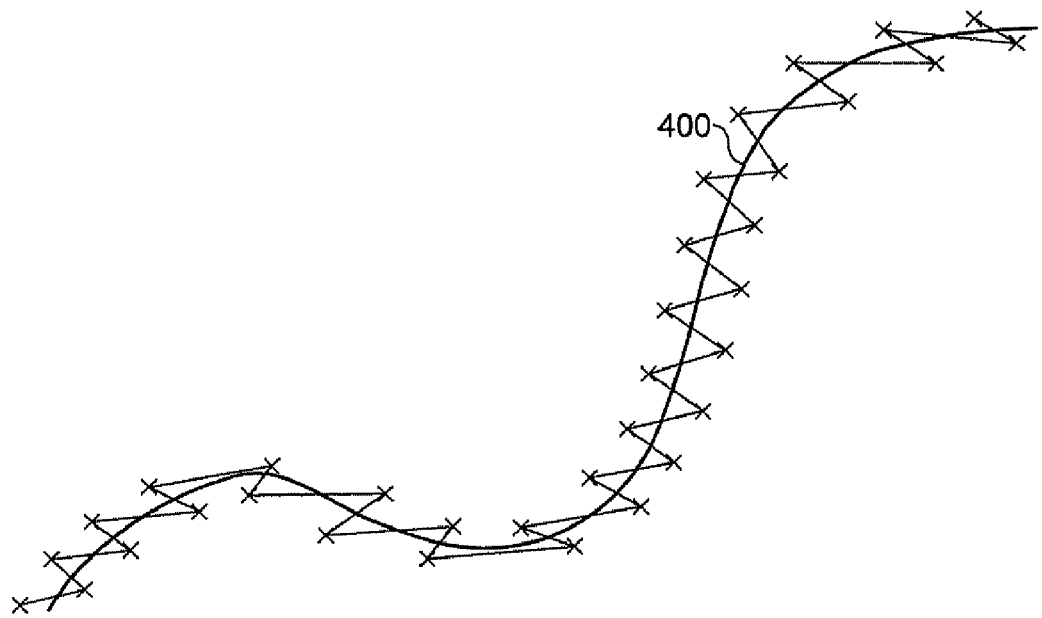
FIG. 7 schematically illustrates the positions of generated stitches on the same path as in FIG. 6 in the "horizontal zig-zag" mode of operation, but with a reduced time period between stitch time points.

FIG. 7 schematically illustrates the positions of generated stitches on the same path 400 as in FIG. 6 in the horizontal zig-zag mode of operation, but with a reduced time period between stitch time points. This more clearly shows the zig-zag nature of the stitches that are produced.

Figure 8:
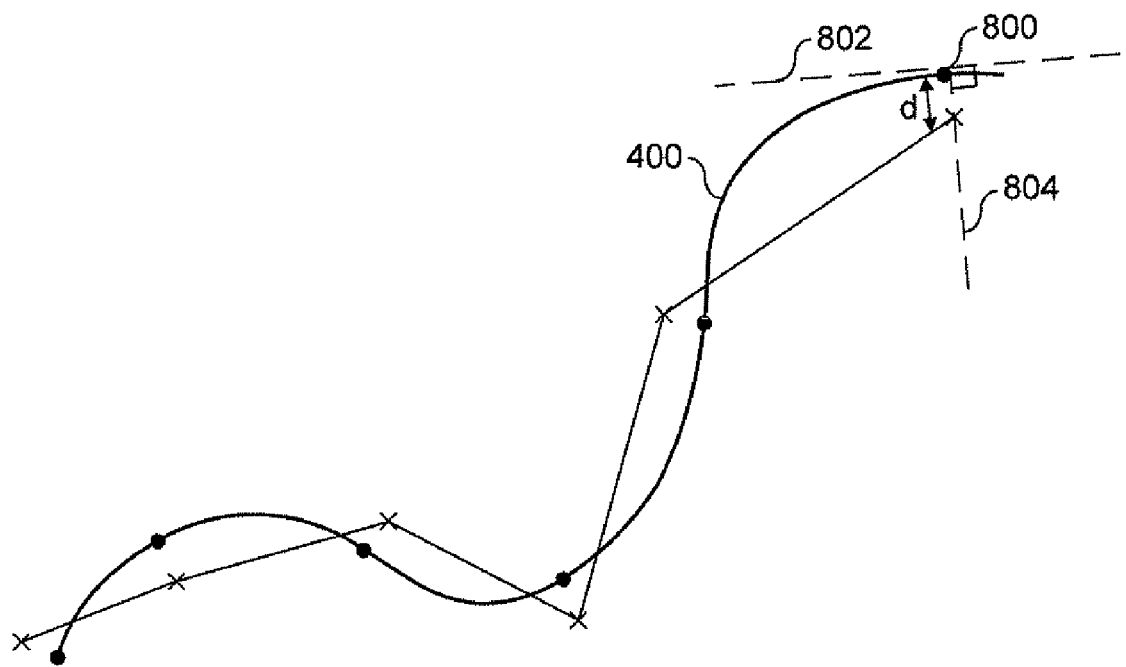
FIG. 8 schematically illustrates the positions of generated stitches on the same path as in FIG. 4 but in a "rotational zig-zag" mode of operation.

FIG. 8 schematically illustrates the positions of generated stitches on the same path 400 as in FIG. 4 but in a "rotational zig-zag" mode of operation. The rotational zig-zag mode of operation is the same as the horizontal mode of operation insofar as an offset displacement is applied to the simulated needle position when generating the embroidery data. However, rather than having the direction of the displacement dependent upon the stitch time point (such as alternating left and right of the simulated needle position as in the horizontal zig-zag mode), the direction of the displacement is dependent on the actual path 400 at the simulated needle position at a stitch time point. For example, in the rotational zig-zag mode the displacement direction is perpendicular to the path 400 of the simulated needle position at each stitch time point. As an example, when the simulated needle position is at a location 800 on the path 400 at a stitch time point, the tangent to the path 400 is a line 802, giving the normal to the path 400 as a line 804. The displacement of the simulated needle position is a distance d along this normal 804. The side of the path 400 at which the displacement is taken alternates between stitch time points.

Figure 9:
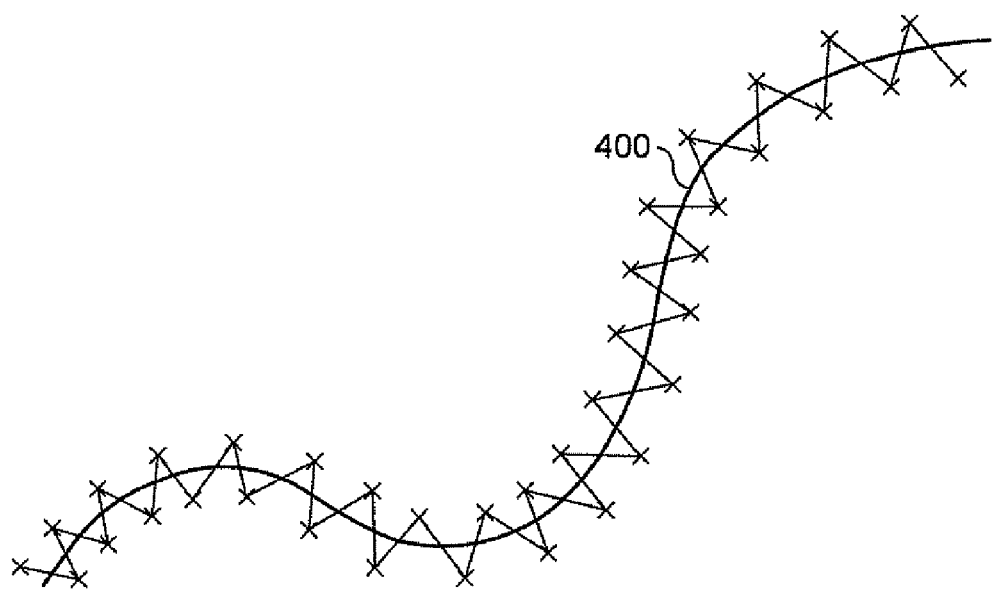
FIG. 9 schematically illustrates the positions of generated stitches on the same path as in FIG. 8 in the "rotational zig-zag" mode of operation, but with a reduced time period between stitch time points.

FIG. 9 schematically illustrates the positions of generated stitches on the same path 400 as in FIG. 8 in the rotational zig-zag mode of operation, but with a reduced time period between stitch time points. This more clearly shows the zig-zag nature of the stitches that are produced.

The offset distance d may be a predetermined offset distance. However, in preferred embodiments, the zig-zag selection control 250 allows the designer to pre-select the offset distance. The zig-zag selection control 250 also allows the designer to control and adjust the offset distance d whilst performing free motion embroidery design. Typically, a value for the offset distance d is between 1.0 mm to 6.0 mm, although it will be appreciated that these are merely illustrative examples and other ranges could be used as appropriate. The offset distance d is then changed in steps of 0.1 mm.

The choice of whether to use the non-zig-zag mode (illustrated in FIGS. 4 and 5), the horizontal zig-zag mode (illustrated in FIGS. 6 and 7) or the rotational zig-zag mode (illustrated in FIGS. 8 and 9) is made using the zig-zag selection control 250. Additionally, the designer can change between these modes during a design process.

It will be appreciated that it may be desirable for the design tool to be configured such that, when the designer does not move the simulated needle position (or only moves it by a very small amount), then new stitches are not generated. Otherwise a large number of stitches at the same location could be generated. An embodiment of this for the rotational zig-zag mode of operation is described below, although it will be appreciated that the techniques used within this embodiment may be used equally within the horizontal zig-zag mode of operation and/or when no zig-zag mode of operation is being used.

Figure 10:
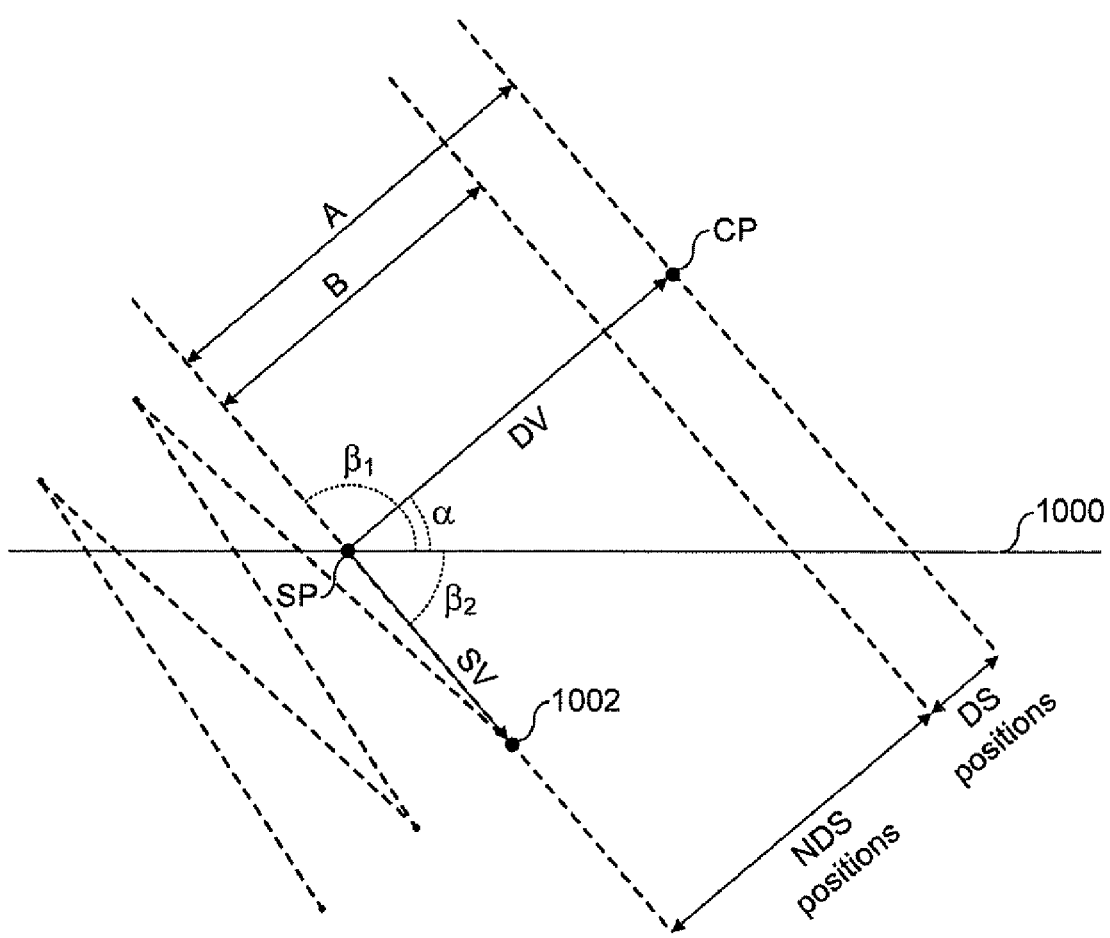
FIG. 10 schematically illustrates an implementation of the "rotational zig-zag" mode of operation.
Figure 11:
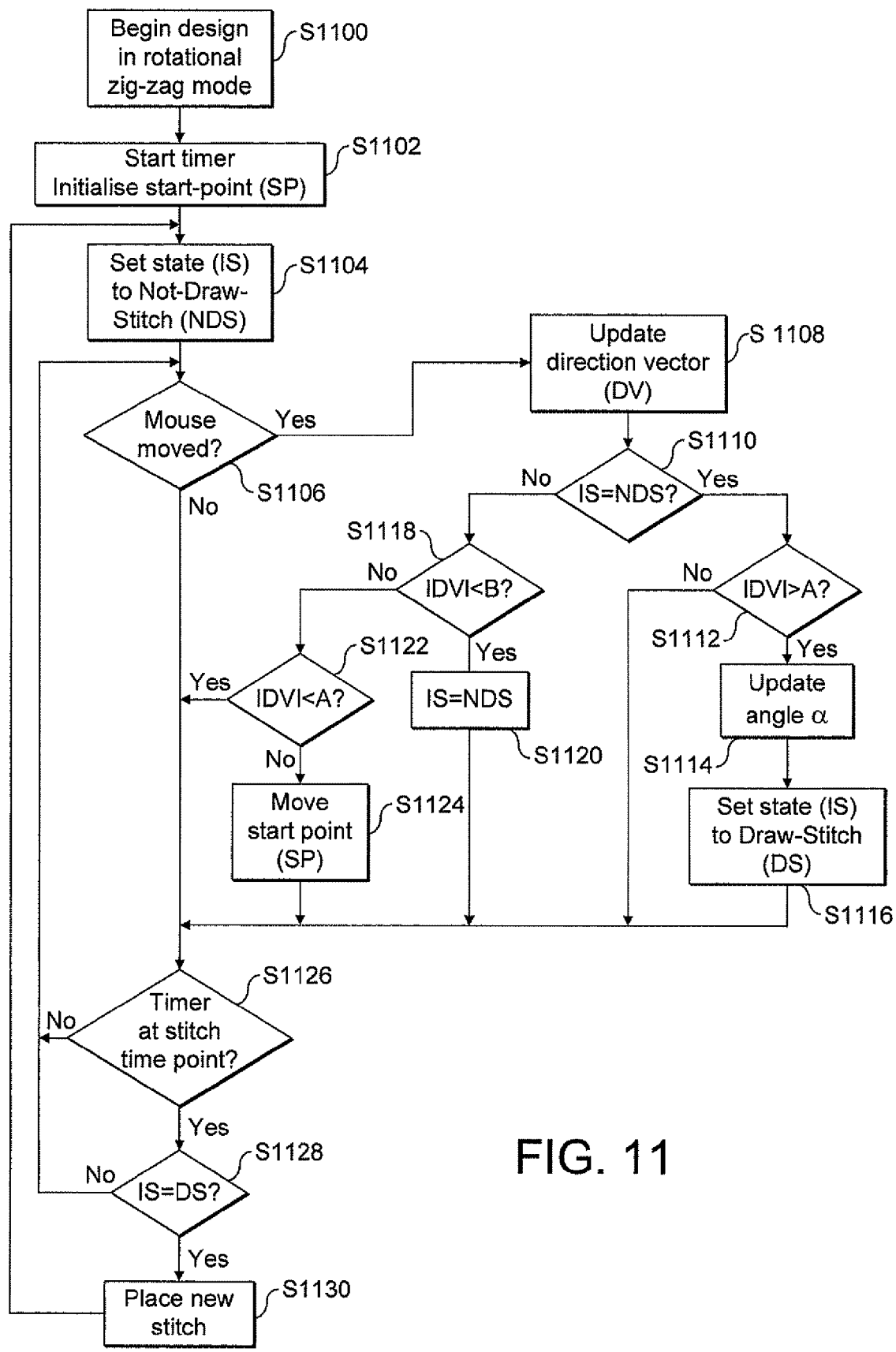
FIG. 11 is a schematic flowchart for implementing the "rotational zig-zag" mode of operation illustrated in FIG. 10.

FIG. 10 schematically illustrates an implementation of the rotational zig-zag mode of operation that will be described with reference to FIG. 11, which is a schematic flowchart for implementing the rotational zig-zag mode of operation illustrated in FIG. 10.

At a step S1100, the designer beings his design in the rotational zig-zag mode of operation. In this embodiment, this is achieved by the designer depressing the left button of the mouse 110, although, as has already been described, any of many alternative methods could be used. The designer remains in the rotational zig-zag design mode whilst the left button of the mouse 110 remains depressed, the processing shown in FIG. 11 stopping when the designer releases the left button of the mouse 110.

At a step S1102, the stitch rate control 238 of the design tool initiates automatic generation of stitch time points, in the same way as has already been described. Additionally, a start point (SP) is initialised at the current position of the simulated needle. As will be described later, the design tool maintains and updates a direction vector (DV) between the start point (SP) and the current position of the simulated needle (CP). DV makes an angle α with a reference line 1000. In this embodiment, the reference line 1000 is a horizontal line across the workspace 204.

At a step S1104, an internal state (IS) of the design tool is initialised. IS represents whether or not a stitch is to be generated. As such, IS may assume one of two values: NDS (Not Draw Stitch) and DS (Draw Stitch). IS is initialised with the value NDS.

At a step S1106, the needle position control 220 determines whether the designer has altered the simulated needle position (position of icon 208) relative to the workspace 204, i.e. whether the designer has moved the mouse 110. If it is determined that the designer has not moved the mouse 110, then processing continues at a step S1126 which will be described later. However, if it is determined that the designer has moved the mouse 110, processing continues at a step S1108 at which DV is updated according to SP and the new (moved) value for CP.

Next, at a step S1110, the design tool determines whether IS is set to NDS. If it is determined that IS is set to NDS, then processing continues at a step S1112 at which the magnitude of DV is compared to a threshold A. Only if the magnitude of DV exceeds the threshold A (i.e. if the designer has moved the simulated needle position far enough from the start point SP), will (i) the angle α be updated according to the updated value of DV at a step S1114 and (ii) IS be set to the value DS at a step S1116 so that a stitch may be generated later. Processing then resumes at the step S1126.

If, at the step S1110, it is determined that IS is not set to the value NDS (i.e. IS is set to the value DS indicating that that a stitch may be generated), then processing continues at a step S1118 at which the magnitude of DV is compared to a threshold B. The threshold B is less than the threshold A. If the magnitude of DV is less than the threshold B (i.e. the designer had moved the simulated needle position far enough from the start point SP, but has now moved it back sufficiently close to the start point SP), then IS is set to the value NDS at a step S1120 so that a stitch will not be generated. Processing then resumes at the step S1126.

If, however, at the step S1118 it is determined that the magnitude of DV is not less than the threshold B, then, at a step S1122, the magnitude of DV is compared to the threshold A. Only if the magnitude of DV is not less than the threshold A will the design tool update the start point SP at a step S1124. At the step S1124, the updated position of SP is the position between SP and CP along the direction of DV such that the new position of SP is a distance A away from CP. The updating of SP simulates a path representing the movement of the simulated needle within the workspace 204. Processing then resumes at the step S1126.

At the step S1126, it is determined whether the next stitch time point has occurred yet. If the next stitch time point has not occurred yet, then processing returns to the step S1106. Otherwise, processing continues at a step S1128, at which it is determined whether IS has a value of DS, i.e. it is determined whether or not a stitch may be generated. If it is determined that a stitch may not be generated, then processing returns to the step S1106. Otherwise, at a step S1130, a new stitch is generated and processing then returns to the step S1104.

Figure 12:
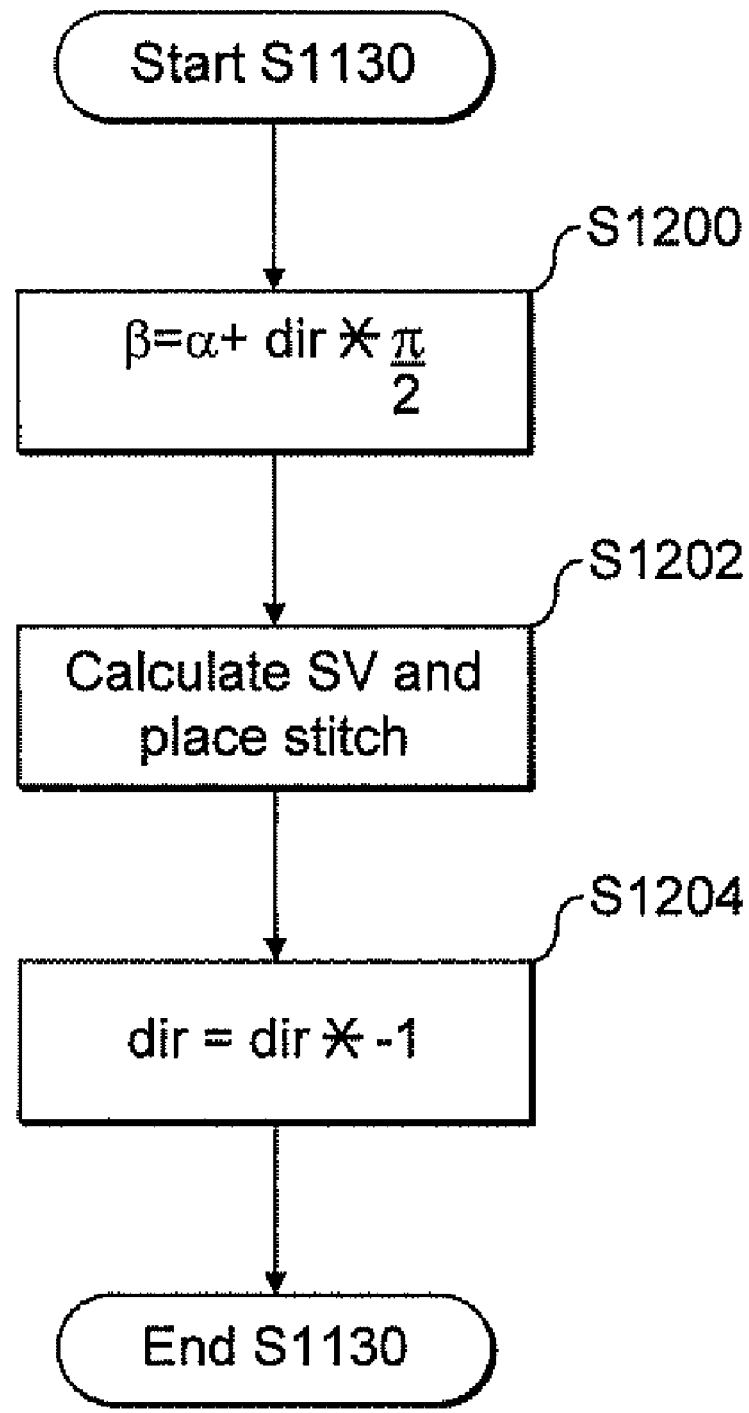
FIG. 12 is a schematic flowchart of the positioning of a new stitch generated according to the flowchart illustrated in FIG. 11.

FIG. 12 is a schematic flowchart of the positioning of a new stitch 1002 at the step S1130.

At a step S1200, an angle β is calculated according to the following equation:

$$\beta = \alpha + dir \ast (\pi/2)$$

Here, dir is a parameter that alternates between the values of −1 and 1. This is initialised on commencing the rotational zig-zag design and may be initialised to either −1 or 1.

The angle β represents an angle for a vector perpendicular to DV. At a step S1202, a stitch vector (SV) is calculated such that SV (i) begins at the start point SP; (ii) has a length according to the zig-zag length setting; and (iii) assumes an angle of β with the reference line 1000. If the value of dir is 1, then SV points to the left of DV whilst if the value of dir is −1, then SV points to the right of DV. The new stitch point 1002 is located at the other end of SV from the start point SP.

Finally, at a step S1204, the value of dir is alternated between −1 and 1. This may be achieved simply by multiplying dir by −1.

In so far as the embodiments of the invention described above are implemented, at least in part, using software-controlled data processing apparatus, it will be appreciated that a computer program providing such software control, a storage medium by which such a computer program is stored and a transmission medium by which such a computer program is transmitted are envisaged as aspects of the present invention.

What is claimed is:

1. A method of generating embroidery data for controlling stitching out by an embroidery machine, the method comprising the steps of:
    simulating a position of a needle on an embroidery workspace;
    updating the needle position in response to an input control signal;
    generating a series of stitch time points; and
    generating embroidery data defining a stitch, the data defining a stitch being dependent upon the needle position at a corresponding stitch time point and at a preceding stitch time point.

2. A method according to claim 1, in which the time between successive stitch time points is a predetermined time period.

3. A method according to claim 1, in which the time between successive stitch time points is a user-selected time period.

4. A method according to claim 3, comprising the step of:
    changing, during the generation of the embroidery data, the time between subsequent successive stitch time points to a new user-selected time period.

5. A method according to claim 1, in which the data defining a stitch comprises data identifying the needle position at the corresponding stitch time point and at the preceding stitch time point.

6. A method according to claim 1, in which the data defining a stitch comprises data identifying a position on a path representing the movement of the needle on the workspace at the corresponding stitch time point offset by a corresponding displacement within the workspace and data identifying a position on the path at a preceding stitch time point offset by a corresponding displacement within the workspace.

7. A method according to claim 6, in which an offset has a corresponding predetermined direction relative to the workspace.

8. A method according to claim 6, in which an offset has a direction dependent upon the direction of the path.

9. A method according to claim 8, in which an offset has a direction perpendicular to the path.

10. A method according to claim 6, in which the magnitude of the offsets is a predetermined magnitude.

11. A method according to claim 6, in which the magnitude of the offsets is a user-selected magnitude.

12. A method according to claim 11, comprising the step of:
    changing, during the generation of the embroidery data, the magnitude of subsequent offsets to a new user-selected magnitude.

13. A method according to claim 1, in which the step of simulating comprises displaying the workspace and the needle position on a display device.

14. A method according to claim 13, in which the step of simulating comprises displaying the needle position at a predetermined position on the display device and the step of updating the needle position comprises moving the displayed workspace relative to the predetermined needle position.

15. A method according to claim 13, in which the step of simulating comprises displaying the workspace at a predetermined position on the display device and the step of updating the needle position comprises moving the displayed needle position relative to the workspace.

16. A method according to claim 13, in which the workspace comprises a displayed reference picture.

17. A method according to claim 1, in which the input control signal is generated in response to the use of one or more of: a mouse, a keyboard, a light pen, a joystick, a drawing tablet, a touch screen and a touch pad.

18. A method according to claim 1, wherein embroidery data defining a stitch is generated if there has been sufficient movement of the needle position.

19. A method according claim 18, comprising the steps of:
    determining a distance that the needle position has moved; and
    determining that embroidery data defining a stitch may be generated if the determined distance exceeds a first threshold distance.

20. A method according to claim 19, comprising the step of:
    once it has been determined that embroidery data defining a stitch may be generated, determining that embroidery data defining a stitch may not be generated if the determined distance is less than a second threshold distance.

21. A computer readable medium having stored thereon computer-executable instructions that cause a computer to perform steps comprising:
    simulating a position of a needle on an embroidery workspace;
    updating the needle position in response to an input control signal;
    generating a series of stitch time points; and
    generating embroidery data defining a stitch, the data defining a stitch being dependent upon the needle position at a corresponding stitch time point and at a preceding stitch time point.

22. An apparatus arranged to execute a computer program that causes the apparatus to generate embroidery data for controlling stitching out by an embroidery machine, wherein execution of the computer program causes the apparatus to:
    simulate a position of a needle on an embroidery workspace;
    update the needle position in response to an input control signal;
    generate a series of stitch time points; and generate embroidery data defining a stitch, the data defining a stitch being dependent upon the needle position at a corresponding stitch time point and at a preceding stitch time point.

23. An apparatus according to claim 22, in which the time between successive stitch time points is a predetermined time period.

24. An apparatus according to claim 22, in which the time between successive stitch time points is a user-selected time period.

25. An apparatus according to claim 24, wherein execution of the computer program causes the apparatus to change, during the generation of the embroidery data, the time between subsequent successive stitch time points to a new user-selected time period.

26. An apparatus according to claim 22, in which the data defining a stitch comprises data identifying the needle position at the corresponding stitch time point and at the preceding stitch time point.

27. An apparatus according to claim 22, in which the data defining a stitch comprises data identifying a position on a path representing the movement of the needle on the workspace at the corresponding stitch time point offset by a corresponding displacement within the workspace and data identifying a position on the path at a preceding stitch time point offset by a corresponding displacement within the workspace.

28. An apparatus according to claim 27, in which an offset has a corresponding predetermined direction relative to the workspace.

29. An apparatus according to claim 27, in which an offset has a direction dependent upon the direction of the path.

30. An apparatus according to claim 29, in which an offset has a direction perpendicular to the path.

31. An apparatus according to claim 27, in which the magnitude of the offsets is a predetermined magnitude.

32. An apparatus according to claim 27, in which the magnitude of the offsets is a user-selected magnitude.

33. An apparatus according to claim 32, wherein execution of the computer program causes the apparatus to change, during the generation of the embroidery data, the magnitude of subsequent offsets to a new user-selected magnitude.

34. An apparatus according to claim 22, in which the apparatus simulates a position of a needle on an embroidery workspace by displaying the workspace and the needle position on a display device.

35. An apparatus according to claim 34, in which the apparatus simulates a position of a needle on an embroidery workspace by displaying the needle position at a predetermined position on the display device and in which the apparatus updates the needle position by moving the displayed workspace relative to the predetermined needle position.

36. An apparatus according to claim 34, in which the apparatus simulates a position of a needle on an embroidery workspace by displaying the workspace at a predetermined position on the display device and in which the apparatus updates the needle position by moving the displayed needle position relative to the workspace.

37. An apparatus according to claim 34, in which the workspace comprises a displayed reference picture.

38. An apparatus according to claim 22, in which the input control signal is generated in response to the use of one or more of: a mouse, a keyboard, a light pen, a joystick, a drawing tablet, a touch screen and a touch pad.

39. An apparatus according to claim 22, wherein embroidery data defining a stitch is generated if there has been sufficient movement of the needle position.

40. An apparatus according claim 39, wherein execution of the computer program causes the apparatus to:
    determine a distance that the needle position has moved; and
    determine that embroidery data defining a stitch may be generated if the determined distance exceeds a first threshold distance.

41. An apparatus according to claim 40, wherein execution of the computer program causes the apparatus to:
    once it has been determined that embroidery data defining a stitch may be generated, determine that embroidery data defining a stitch may not be generated if the determined distance is less than a second threshold distance.

* * * * *

UNITED STATES PATENT AND TRADEMARK OFFICE
CERTIFICATE OF CORRECTION

PATENT NO. : 8,108,062 B2  
APPLICATION NO. : 11/551461  
DATED : January 31, 2012  
INVENTOR(S) : Andew Kaymer et al.

Page 1 of 1

It is certified that error appears in the above-identified patent and that said Letters Patent is hereby corrected as shown below:

Title Page:

Item (73), Assignee, replace "VSM Group AB" with "KSIN Luxembourg II, S.AR.L."

Signed and Sealed this
Nineteenth Day of March, 2013

Teresa Stanek Rea
*Acting Director of the United States Patent and Trademark Office*